Oct. 6, 1953

C. L. BLAIR ET AL 2,654,613

IMPLEMENT AND TRAILER HITCH

Filed March 28, 1952

INVENTORS
C. L. Blair & R. L. Fox

BY

Attorney

UNITED STATES PATENT OFFICE 2,654,613

IMPLEMENT AND TRAILER HITCH

Cecil L. Blair and Richard L. Fox, Waterloo, Iowa, assignors to Deere Manufacturing Co., Dubuque, Iowa, a corporation of Iowa Application March 28, 1952, Serial No. 282,604

1 Claim. (Cl. 280—33.15)

This invention relates to a hitch or coupling means and particularly to such means for connecting agricultural implements or trailers to draft vehicles such as tractors. More specifically, the invention relates to improved means for preventing accidental release of a coupling or hitch pin.

A typical hitch construction will involve a horizontal drawbar having an apertured end through which a hitch pin may be dropped to connect the tongue or beam of a trailing vehicle or implement. Normally, it is expected that the weight of the hitch pin and the horizontal forces imposed thereon would be sufficient to prevent accidental upward escape of the pin. But this is not so, for upward forces of considerable magnitude are known to be developed in hitches of this character, with the result that the hitch pin is dislodged and the interconnection between the draft and trailing vehicles is destroyed. Of course, various means for retaining the hitch pin in place could be employed, such as cotters, nuts and the like, but these are apt to become lost or mislaid and the user will then be inclined to resort to makeshift remedies and will find ultimately that the hitch is just not suitable for his purposes.

According to the present invention, these disadvantages are eliminated by the provision of a drawbar or hitch construction in which a vertical hitch pin is retained in place by a lock member having associated therewith stop means for preventing removal of the hitch pin in an upward direction unless the lock member is first turned angularly. A further object of the invention is to utilize interengageable parts on the lock member and hitch pin which must first be released before the lock member can be moved to a position permitting removal of the pin. It is an object of the invention to provide a hitch or coupling of the character described which is simple in construction and economical to manufacture and purchase.

The foregoing and other important objects and desirable features inherent in and encompassed by the invention will become apparent as a preferred embodiment of the invention is disclosed in detail in the following description and accompanying sheet of drawings in which Figure 1 is a perspective view of a drawbar equipped with one form of the invention;

Figure 1:
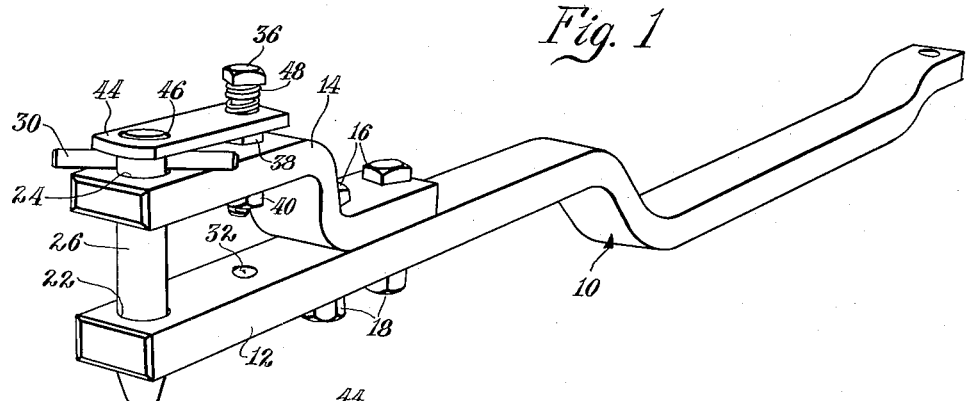
Figure 2:
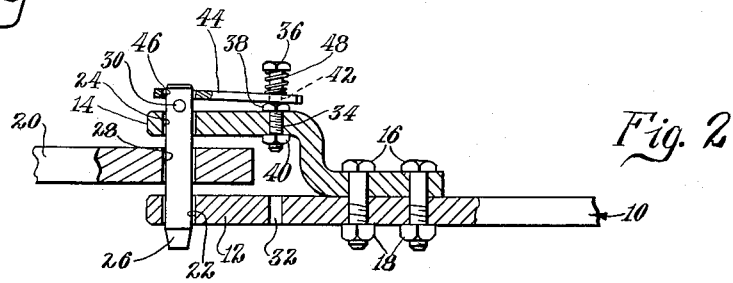
Figure 2 is a fragmentary sectional view, on a reduced scale, showing the drawbar member arranged in one position.
Figure 3:
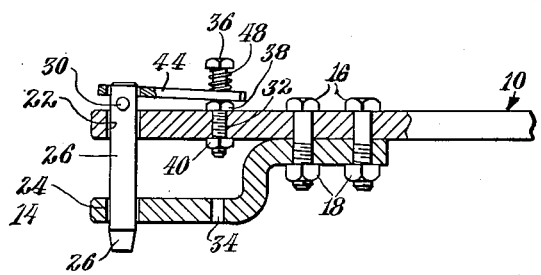
Figure 3 is a similar view showing a different position of the drawbar.

The hitch comprises essentially an elongated drawbar member 10 having a bifurcated rear end made up of an integral portion 12 of the member 10 and an offset member 14. As shown in Figures 2 and 3, the member 14 may be secured to the portion 12 in either of two positions. Bolts and nuts 16 and 18 are shown as a representative form of securing means. The bifurcation provided by the portions 12 and 14 enables the drawbar member to receive a trailer or implement tongue, designated generally by the numeral 20 in Figure 2.

The drawbar portion 12 is provided with a vertical aperture 22 coaxial with a vertical aperture 24 in the portion 14. Regardless of which of the portions 12 or 14 is uppermost, the drawbar member 12 may be considered as having an upper surface and a hitch pin 26 is insertable downwardly in or withdrawable upwardly from the alined apertures 22 and 24. The implement member or tongue 20 has, of course, a registering aperture 28 through which the hitch pin may extend.

The hitch pin is provided adjacent its upper end portion with a transverse handle member 30 for facilitating handling of the hitch pin. The handle may comprise a rod inserted through a transverse bore in the pin and in addition to its function as a handle serves also as an abutment having a radial dimension greater than that of the aperture 24 (or 22) so as to prevent the hitch pin from dropping straight through the apertures.

The drawbar portion 12 has a second and smaller aperture or bore 32 and a similar bore or aperture 34 is formed in the drawbar portion 14. Depending upon which of the drawbar portions 12 or 14 is uppermost, one or the other of the apertures 32 or 34 carries a stud 36 on an axis parallel to the common axis of the hitch pin apertures 22 and 24. In the preferred design shown, the stud 36 takes the form of a headed bolt appropriately threaded to receive upper and lower nuts 38 and 40. The head of the bolt forms a stop at a distance spaced above the top of the drawbar member less than the distance of projection of the lower end of the hitch pin 26 below the lower part of the drawbar member. The purposes of this relationship will be brought out below.

The stud or bolt 36 passes through a vertical aperture 42 in one end of a lock member or plate 44. The opposite end of the plate has a vertical aperture 46. The plate overlies the top of the drawbar member with the aperture 42 received by the stud and the aperture 46 normally above or coaxial with the upper end portion of the hitch pin 26. This upper end of the hitch pin is reduced radially below the radial dimension of the abutment provided by the transverse handle 30 so that it is loosely received by the aperture 46 in the plate 44. Of course, as shown, the hitch pin 26 is of uniform diameter throughout except for a tapered lower end, but the point is that the transverse handle 30 serves the dual function of engaging the top of the drawbar member and the bottom of the plate or locking member 44.

Biasing means in the form of a coiled compression spring 48 encircles the stud 36 between the top of the lock member 44 and the undersurface of the headed end of the bolt. Thus, this biasing means acts downwardly on the locking member 44 and upwardly against the stop on the stud to urge the lock member 44 downwardly.

The relationship between the extreme upper end of the hitch pin 26 and the aperture 46 in the free end of the lock member 44 is such as to give these two parts the effect of cooperative selectively engageable and disengageable elements capable of locking the pin 26 in place. That is to say, when the pin 26 is inserted downwardly through the alined apertures 22 and 24 in the drawbar member, the abutment provided by the transverse handle 30 prevents the pin from dropping completely through the apertures, since this abutment engages the top of the drawbar member. The locking member or plate 44 overlies the top of the drawbar member so that the aperture 46 receives the upper end of the hitch pin 26. The engagement between the lock member and the hitch pin prevents the lock member from moving laterally. The bias of the spring 48 resists upward movement of the plate 44, which upward movement is normally further resisted because of the cocking action of the plate 44 relative to the stud 36, because of the loose fit of the stud 36 with the aperture 42 in the plate. Further, even though the hitch pin 26 should work upwardly and overcome the resistance of the spring 48 and the cocking relationship between 36 and 42, the compressed spring and headed end of the stud 36 limit upward movement of the plate 44 to an extent requiring disengagement of the plate 44 from the pin 26 before the pin can be either accidentally or deliberately withdrawn. In other words, the pin and lock member 44 are mutually cooperative to prevent abnormal functioning of each other.

Figure 4:
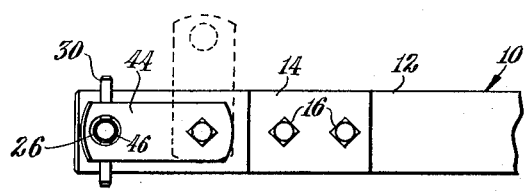
Figure 4 is a plan view of the hitch as shown in Figure 2, the release or turned position of the lock member being indicated in dotted lines.

When it is desired to remove the pin 26, the plate 44 can be easily lifted upwardly against the bias of the spring 48, thus disengaging the aperture 46 from the top of the pin 26 so that the plate may be turned to the position indicated in dotted lines in Figure 4. The plate is now clear of the handle portion or abutment 30 on the hitch pin. Locking of the hitch pin in place after it is re-inserted is just as easily accomplished by first inserting the pin and then swinging the lock member 44 to its position in which it overlies the drawbar member so that the aperture 46 receives the top of the hitch pin 26.

Since there are apertures 32 and 34 respectively in the drawbar portions 12 and 14, the arrangement will be the same regardless of which portion of the drawbar is uppermost. Changes in position of the drawbar in the respect noted is important for the purposes of changing the height of the hitch connection, as in cases in which the drawbar forms part of the equipment of a tractor or other vehicle.

Various other features and advantages of the invention not specifically enumerated herein will undoubtedly occur to those versed in the art, as likewise will numerous modifications and alterations in the preferred embodiment of the invention disclosed, all of which may be achieved without departing from the spirit and scope of the invention as defined in the appended claim.

What is claimed is:

In a hitch of the character described: a horizontal drawbar member having a vertical opening therein; a stud projecting upwardly from the top of the drawbar member on an axis parallel to that of the opening; a vertical hitch pin insertable downwardly into and withdrawable upwardly from the opening and having an upper portion of greater radial dimension than the opening to provide an abutment engaging the top of the drawbar member to hold the pin against dropping through the opening, said pin further having its upper end projecting above and reduced in radial dimension below that of the abutment portion; a lock member overlying the top of the drawbar member and including first and second opposite ends respectively having first and second vertical apertures, said first aperture loosely fitting the stud to carry the lock member vertically slidably and laterally swingably on the stud, and said second aperture being selectively downwardly engageable with and upwardly disengageable from the upper end of the hitch pin to respectively prevent and permit lateral swinging of the lock member on the stud; a stop fixed to the top of the stud at a distance above the top of the drawbar less than the length of the hitch pin below its abutment portion for limiting upward movement of the lock member on the stud to an extent requiring lateral swinging of the lock member before the hitch pin can be withdrawn; and biasing means acting downwardly on the first end of the lock member and reacting against the stop on the stud to resiliently retain engagement between the second end of the lock member and the upper end of the hitch member; said second end of the lock member and the upper end of the hitch member constituting, when engaged, the sole means for preventing lateral swinging of the lock member.

CECIL L. BLAIR.
RICHARD L. FOX.

References Cited in the file of this patent

UNITED STATES PATENTS

| Number | Name | Date |
|---|---|---|
| 122,963 | Racine | Jan. 23, 1872 |
| 225,011 | Harder | Mar. 2, 1880 |
| 1,095,859 | Havens | May 5, 1914 |
| 1,419,398 | Mason | June 13, 1922 |
| 2,522,215 | Du Shane | Sept. 12, 1950 |